US012786766B2

(12) United States Patent
Belleschi et al.

(10) Patent No.: US 12,786,766 B2
(45) Date of Patent: Nov. 3, 2026

(54) INTER-NODE SIGNALING FOR CONFIGURATION OF A SUCCESSFUL HANDOVER REPORT

(71) Applicant: Telefonaktiebolaget LM Ericsson (publ), Stockholm (SE)

(72) Inventors: Marco Belleschi, Solna (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 343 days.

(21) Appl. No.: 18/569,725

(22) PCT Filed: Jun. 24, 2022

(86) PCT No.: PCT/IB2022/055900

§ 371 (c)(1),
(2) Date: Dec. 13, 2023

(87) PCT Pub. No.: WO2022/269567

PCT Pub. Date: Dec. 29, 2022

(65) Prior Publication Data

US 2024/0388973 A1 Nov. 21, 2024

Related U.S. Application Data

(60) Provisional application No. 63/214,482, filed on Jun. 24, 2021.

(51) Int. Cl.

*H04W 24/08* (2009.01)
*H04W 36/00* (2009.01)
*H04W 36/08* (2009.01)

(52) U.S. Cl.

CPC ....... *H04W 24/08* (2013.01); *H04W 36/0058* (2018.08); *H04W 36/00838* (2023.05); *H04W 36/08* (2013.01)

(58) Field of Classification Search

CPC ............. H04W 24/08; H04W 36/0058; H04W 36/00838; H04W 36/08

(Continued)

(56) References Cited

U.S. PATENT DOCUMENTS 10,251,100 B2 * 4/2019 Masini .............. H04W 36/0027
11,356,903 B2 * 6/2022 Wu .................. H04W 36/0058

(Continued)

FOREIGN PATENT DOCUMENTS

WO 2020167237 A1 8/2020
WO 2021086249 A1 5/2021

OTHER PUBLICATIONS

International Search Report and Written Opinion of the International Searching Authority, PCT/IB2022/055900, mailed Nov. 22, 2022, 17 pages.

(Continued)

*Primary Examiner* — Hirdepal Singh
(74) *Attorney, Agent, or Firm* — Sage Patent Group

(57) ABSTRACT

A communication device can receive a successful handover report ("SHR") configuration from a first network node. The SHR configuration can include a triggering condition. The communication device can apply the SHR configuration. Responsive to the triggering condition being satisfied during a handover of the communication device from the first network node to a second network node, the communication device can store the SHR generated based on the SHR configuration.

18 Claims, 9 Drawing Sheets

(58) Field of Classification Search
USPC .......................................................... 455/436
See application file for complete search history.

(56) References Cited

U.S. PATENT DOCUMENTS

| | | | | |
|---|---|---|---|---|
| 2023/0199578 | A1* | 6/2023 | Wu | H04W 36/305<br>370/331 |
| 2023/0422135 | A1* | 12/2023 | Wu | H04W 36/18 |
| 2024/0080741 | A1* | 3/2024 | Zeng | H04W 36/324 |
| 2024/0215099 | A1* | 6/2024 | Chang | H04W 36/00837 |

OTHER PUBLICATIONS

OPPO, "Further consideration on successful handover report and UE history information in EN-DC," 3GPP TSG-RAN WG2 Meeting #113bis electronic, R2-2103148, Online, Jan. 2020, 4 pages.

* cited by examiner

INTER-NODE SIGNALING FOR CONFIGURATION OF A SUCCESSFUL HANDOVER REPORT

CROSS REFERENCE TO RELATED APPLICATIONS

This application is a 35 U.S.C. § 371 national stage application of PCT International Application No. PCT/IB2022/055900 filed on Jun. 24, 2022, which in turn claims domestic priority to U.S. Provisional Patent Application No. 63/214,482, filed on Jun. 24, 2021, the disclosures and content of which are incorporated by reference herein in their entirety.

TECHNICAL FIELD

The present disclosure is related to wireless communication systems and more particularly to inter-node signaling for configuration of a successful handover report.

BACKGROUND

FIG. 1 illustrates an example of a new radio ("NR") network (e.g., a 5th Generation ("5G") network) including a 5G core ("5GC") network 130, network nodes 120*a-b* (e.g., 5G base station ("gNB")), multiple communication devices 110 (also referred to as user equipment ("UE")).

FIG. 2 illustrates a wireless communications network with a UE 110, which communicates with one or multiple access nodes 120*a-b*, which in turn are each connected to a network node 132. The access nodes 120*a-b* are part of a radio access network 100.

For wireless communication systems pursuant to a 3rd generation partnership project ("3GPP") Evolved Packet System ("EPS") (also referred to as Long Term Evolution ("LTE") or 4th generation ("4G")) standard specifications, such as specified in 3GPP TS 36.300 and related specifications, the access nodes 120*a-b* can correspond to an Evolved NodeB ("eNB") and the network node 132 to a core network node in a core network (e.g., core network 130 of FIG. 1). The network node 132 can correspond to either a Mobility Management Entity ("MME") and/or a Serving Gateway ("SGW"). The access nodes 120*a-b* can be part of the radio access network 100, which in this example may be an Evolved Universal Terrestrial Radio Access Network ("E-UTRAN"), while the network node 132 may both be part of an Evolved Packet Core ("EPC") network. The access nodes 120*a-b* can be inter-connected via the X2 interface, and connected to EPC via a S1 interface, more specifically via a S1-C to a MME and S1-U to a SGW.

For wireless communication systems pursuant to 3GPP 5G Systems ("5GS") (also referred to as New Radio ("NR") or 5G) standard specifications, such as specified in 3GPP TS 38.300 and related specifications, on the other hand, the access nodes 120*a-b* can correspond to a 5G NodeB ("gNB") and the network node 132 can correspond to either an Access and Mobility Management Function ("AMF") and/or a User Plane Function ("UPF"). The gNB can be part of the radio access network 100, which in this example is the Next Generation Radio Access Network ("NG-RAN"), while the AMF and UPF are both part of the 5G Core Network ("5GC"). The gNBs can be inter-connected via the Xn interface, and connected to 5GC via the NG interface, more specifically via NG-C to the AMF and NG-U to the UPF.

SUMMARY

According to some embodiments, a method performed by a communication device for configuration of a successful handover report ("SHR") is provided. The method includes receiving a SHR configuration from a first network node, the SHR configurations including a triggering condition. The method further includes applying the SHR configuration. The method further includes, responsive to the triggering condition being satisfied during a handover of the communication device from the first network node to a second network node, storing the SHR generated based on the SHR configuration.

According to other embodiments, a method performed by a first network node for configuration of a successful handover report ("SHR") is provided. The method includes transmitting a request for SHR configuration information to a second network node. The first network node is a source node for a handover of a communication device and the second network node is a target node for the handover of the communication device. The method further includes receiving the SHR configuration information from the second network node. The SHR configuration information is associated with the communication device. The method further includes determining a SHR configuration based on the SHR configuration information. The method further includes transmitting the SHR configuration to the communication device.

According to other embodiments, a method performed by a second network node for configuration of a successful handover report ("SHR") is provided. The method includes receiving a request for SHR configuration information from a first network node. The first network node is a source node for a handover of a communication device and the second network node is a target node for the handover of the communication device. The method further includes determining the SHR configuration information. The SHR configuration information is associated with the communication device. The method further includes transmitting the SHR configuration information to the first network node.

According to other embodiments, a method performed by a third network node for handling a successful handover report ("SHR") is provided. The method includes receiving the SHR from a communication device. The SHR is associated with a handover of the communication device between a first network node and a second network node. The method further includes transmitting the SHR to at least one of the first network node and the second network node based on information associated with the SHR.

According to other embodiments, a communication device, network node, non-transitory readable medium, computer program, or computer program product is provided to perform one of the above methods.

Certain embodiments may provide one or more of the following technical advantages. In some embodiments, the source node is able to determine whether to configure or not configure the SHR to the UE. For example, in case the target node does not support the fetching of the SHR information, then the source node may avoid configuring the SHR to the UE, thereby saving configuration signaling and UE memory consumption.

In additional or alternative embodiments, the target node determines whether additional SHR triggering conditions should be configured as part of the SHR configuration to the UE, and retrieves the SHR in case the SHR is generated by the UE upon fulfilling one or more of the triggering conditions requested by the target. In additional or alternative embodiments, the target node would not need to provide a new SHR configuration after the UE is handed-over to the target. This can be particularly beneficial in case the UE needs to be handed-over back from the target node to the source before receiving a new SHR configuration from the target.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
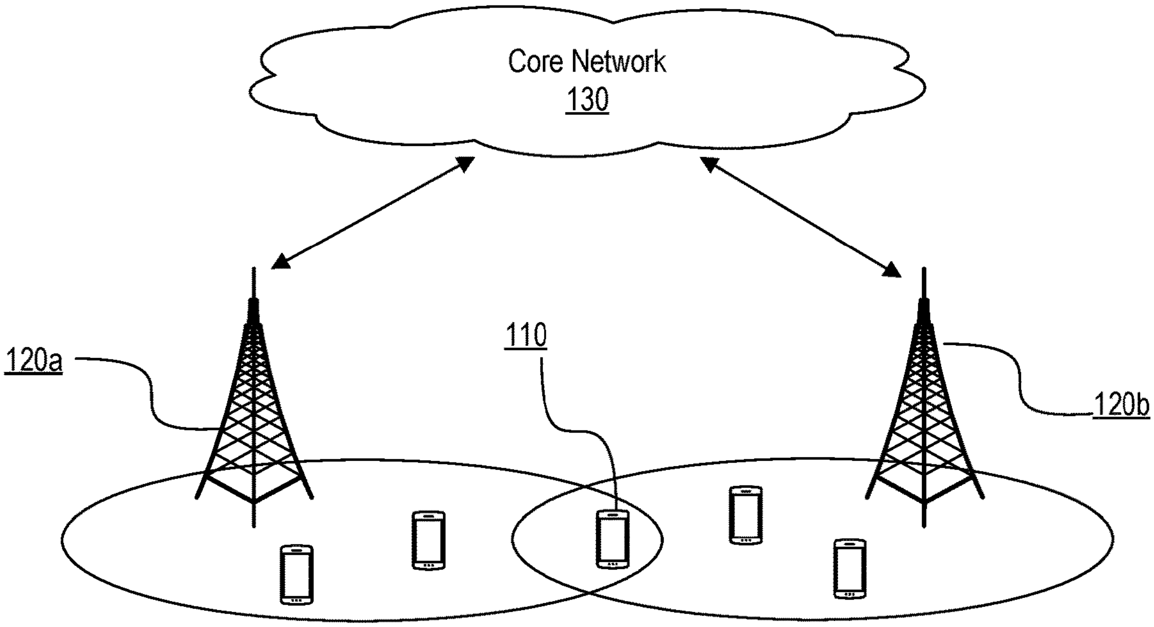
FIG. 1 is a schematic diagram illustrating an example of a 5th generation ("5G") network.
Figure 2:
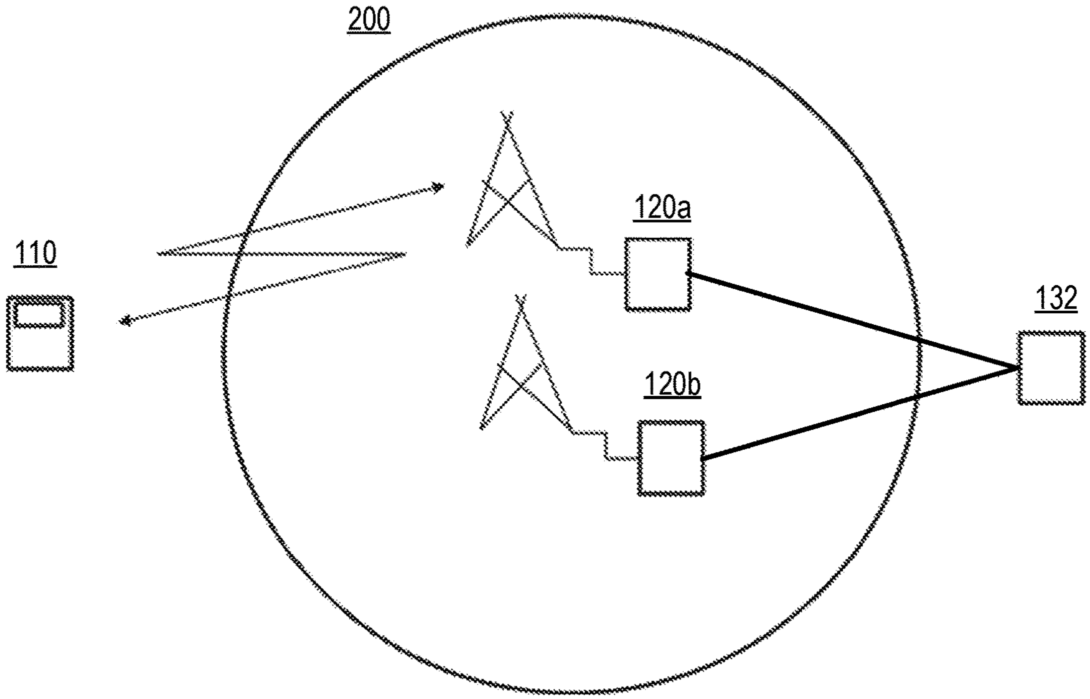
FIG. 2 is a schematic diagram illustrating an example of a wireless communication system.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

To support fast mobility between NR and LTE and avoid change of core network, LTE eNBs can also be connected to the 5G-CN via NG-U/NG-C and support the Xn interface. An eNB connected to 5GC is called a next generation eNB ("ng-eNB") and is considered part of the NG-RAN. It should be noted that most of the solutions/features described for LTE and NR in this document also apply to LTE connected to 5GC. In this document, when the term LTE is used without further specification it can refer to LTE-EPC.

Mobility in RRC_CONNECTED state is also known as handover. The purpose of handover is to move a UE (due to, for example, mobility) from a source access node using a source radio connection (also known as source cell connection) to a target access node, using a target radio connection (also known as target cell connection). The source radio connection is associated with a source cell controlled by the source access node. The target radio connection is associated with a target cell controlled by the target access node. So in other words, during a handover, the UE moves from the source cell to a target cell. Sometimes the source access node or the source cell is referred to as the "source," and the target access node or the target cell is sometimes referred to as the "target".

In some examples, the source access node and target access node are different nodes, such as different eNBs or gNBs. These examples can be referred to as inter-node handover, inter-eNB handover, or inter-gNB handover. In other examples, the source access node and target access node are the same node, such as the same eNB and gNB. These examples can be referred to as intra-node handover, intra-eNB handover, or intra-gNB handover and covers the scenarios in which source and target cells are controlled by the same access node. In yet other examples, handover is performed within the same cell (and thus also within the same access node controlling that cell). These examples can be referred to as intra-cell handover.

The source access node and target access node can refer to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

An RRC_CONNECTED UE in E-UTRAN or NG-RAN can be configured by the network to perform measurements of serving and neighbor cells and based on the measurement reports sent by the UE, the network may decide to perform a handover of the UE to a neighbor cell. The network then sends a Handover Command message to the UE (in LTE an RRCConnectionReconfiguration message with a field called mobilityControlInfo and in NR an RRCReconfiguration message with a reconfigurationWithSync field).

These reconfigurations can be prepared by the target access node upon a request from the source access node (over X2 or S1 interface in case of EUTRA-EPC or Xn or NG interface in case of NG-RAN-5GC) and can take into account the existing RRC configuration and UE capabilities as provided in the request from the source access node and its own capabilities and resource situation in the intended target cell and target access node. The reconfiguration parameters provided by the target access node includes, for example, information needed by the UE to access the target access node (e.g., random access configuration, a new C-RNTI assigned by the target access node, and security parameters enabling the UE to calculate new security keys associated to the target access node) so the UE can send a Handover Complete message (in LTE an RRConnectionReconfiguratioComplete message and in NR an RRCReconfigurationComplete message) on SRB1 encrypted and integrity protected based on new security keys upon accessing the target access node.

Figure 3:
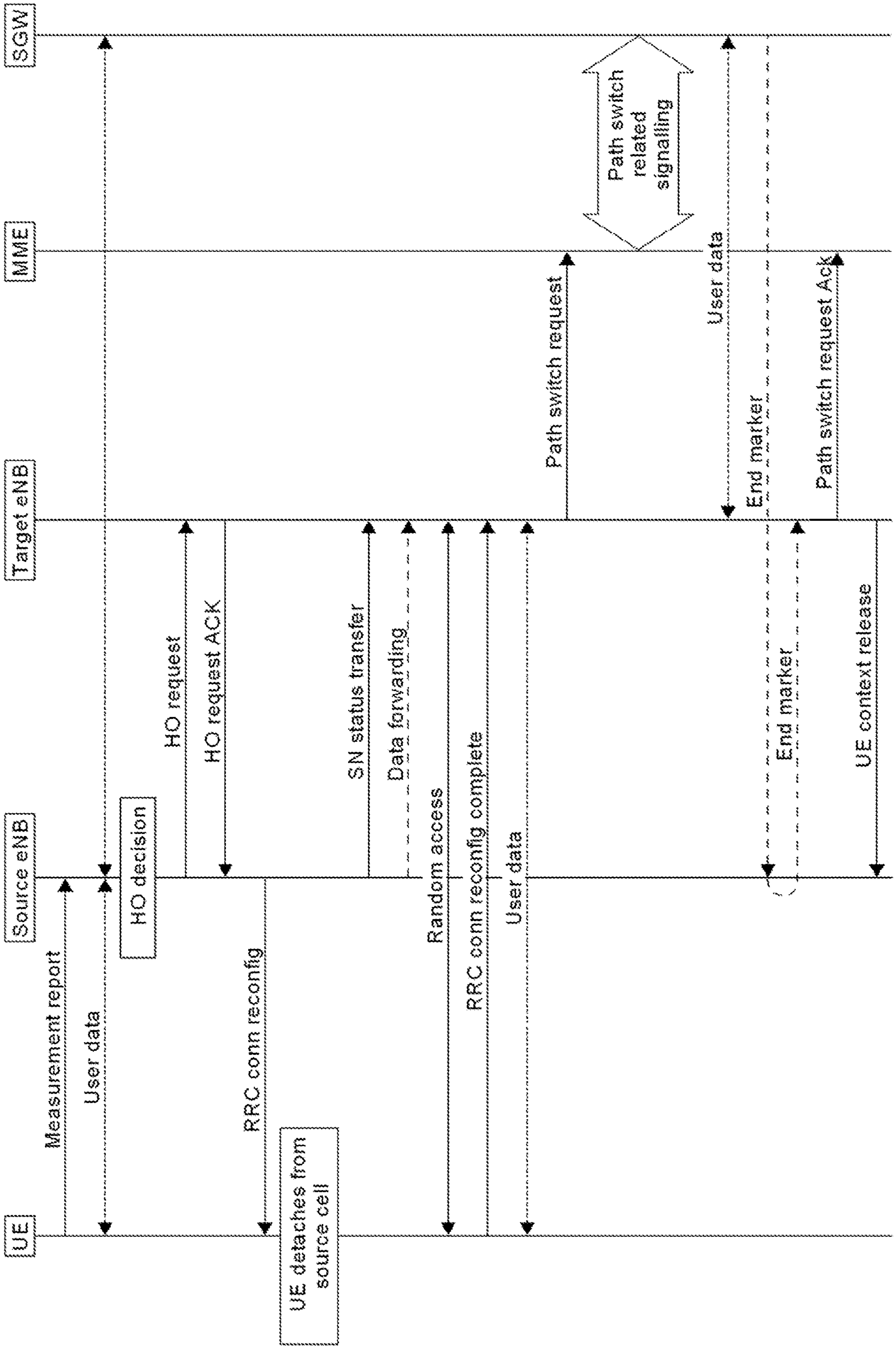
FIG. 3 is a signal flow diagram illustrating an example of a handover in a long term evolution network.

FIG. 3 illustrates an example of a signaling flow between a UE, a source access node (also known as source gNB, source eNB or source cell), and a target access node (also known as target gNB, target eNB or target cell) during a handover procedure, using LTE as example.

Depending on the required quality of service ("QoS"), either a seamless or a lossless handover is performed as appropriate for each user plane radio bearer.

Seamless handover is applied for user plane radio bearers mapped on RLC Unacknowledged Mode ("UM"). These types of data are typically reasonably tolerant of losses but less tolerant of delay (e.g., voice services). Seamless handover is therefore designed to minimize complexity and delay, but may result in loss of some packet data convergence protocol ("PDCP") service data units ("SDUs").

At handover, for radio bearers to which seamless handover applies, the PDCP entities including the header compression contexts are reset, and the COUNT values are set to zero. As a new key is anyway generated at handover, there is no security reason to maintain the COUNT values. PDCP SDUs in the UE for which the transmission has not yet started will be transmitted after handover to the target access node. In the source access node, PDCP SDUs that have not yet been transmitted can be forwarded via the X2/Xn interface to the target access node. PDCP SDUs for which the transmission has already started but that have not been successfully received will be lost. This minimizes the complexity because no context (e.g., configuration information) has to be transferred between the source access node and the target access node at handover.

Based on the SN that is added to PDCP Data PDUs it is possible to ensure in-sequence delivery during handover, and even provide a fully lossless handover functionality, performing retransmission of PDCP SDUs for which reception has not yet been acknowledged prior to the handover. This lossless handover function is used mainly for delay-tolerant services such as file downloads where the loss of one PDCP SDU can result in a drastic reduction in the data rate due to the reaction of the Transmission Control Protocol ("TCP").

Lossless handover is applied for user plane radio bearers that are mapped on radio link control ("RLC") Acknowledged Mode ("AM"). When RLC AM is used, PDCP SDUs that have been transmitted but not yet been acknowledged by the RLC layer are stored in a retransmission buffer in the PDCP layer.

In order to ensure lossless handover in the downlink ("DL"), the source access node forwards the DL PDCP SDUs stored in the retransmission buffer as well as fresh DL PDCP SDUs received from the gateway to the target access node for (re-)transmission. The source access node receives an indication from the core network gateway (SGW in LTE/EPC, UPF in LTE/5GC and NR) that indicates the last packet sent to the source access node (a so called "end marker" packet). The source access node also forwards this indication to the target access node so that the target access node knows when it can start transmission of packets received directly from the gateway.

In order to ensure lossless handover in the uplink ("UL"), the UE retransmits the UL PDPC SDUs that are stored in the PDCP retransmission buffer in the target access node. The retransmission is triggered by the PDCP reestablishment that is performed upon reception of the handover command. The source access node, after decryption and decompression, will forward all PDCP SDUs received out of sequence to the target access node. Thus, the target access node can reorder the PDCP SDUs received from the source access node and the retransmitted PDCP SDUs received from the UE based on the PDCP SNs which are maintained during the handover, and deliver them to the gateway in the correct sequence.

An additional feature of lossless handover is so-called selective retransmission. In some cases it may happen that a PDCP SDU has been successfully received, but a corresponding RLC acknowledgement has not. In this case, after the handover, there may be unnecessary retransmissions initiated by the UE or the target access node based on the incorrect status received from the RLC layer. In order to avoid these unnecessary retransmissions a PDCP status report can be sent from the target access node to the UE and from the UE to the target access node. Whether to send a PDCP status report after handover is configured independently for each radio bearer and for each direction.

A Self-Organizing Network ("SON") is an automation technology designed to make the planning, configuration, management, optimization and healing of mobile radio access networks simpler and faster. SON functionality and behavior has been defined and specified in generally accepted mobile industry recommendations produced by organizations such as 3GPP and the Next Generation Mobile Networks ("NGMN").

In 3GPP, the processes within the SON area are classified into Self-configuration process and Self-optimization process. Self-configuration process is the process where newly deployed nodes are configured by automatic installation procedures to get the necessary basic configuration for system operation.

This process works in pre-operational state. Pre-operational state is understood as the state from when the eNB is powered up and has backbone connectivity until the RF transmitter is switched on.

Figure 4:
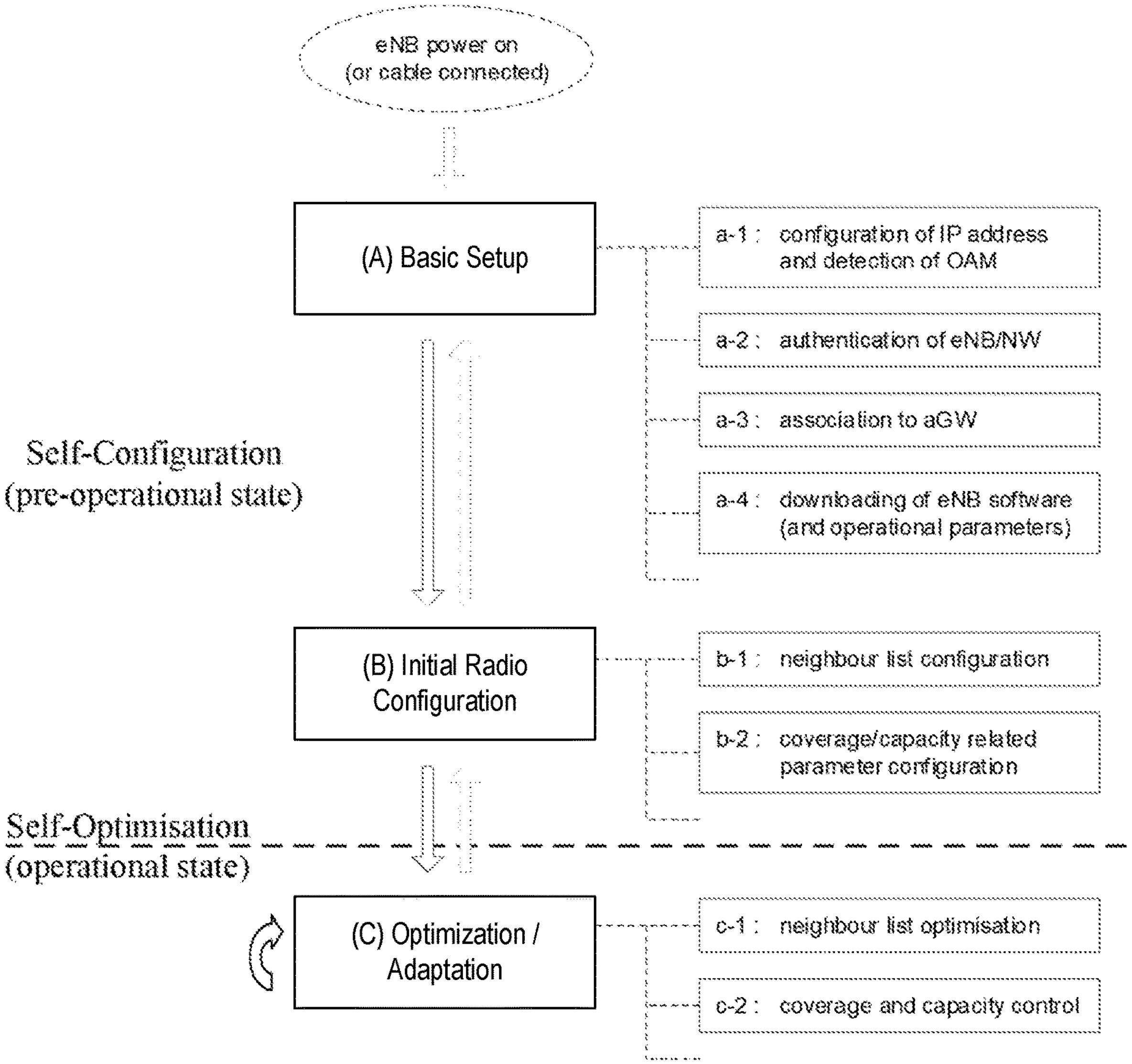
FIG. 4 is a flow chart illustrating an example of ramifications of self-configuration/self-optimization functionality.

As illustrated in FIG. 4, functions handled in the pre-operational state like: Basic Setup; and Initial Radio Configuration are covered by the Self Configuration process. The Self-optimization process is defined as the process where UE and access node measurements and performance measurements are used to auto-tune the network. This process works in operational state. Operational state is understood as the state where the RF interface is additionally switched on.

As illustrated in FIG. 4, functions handled in the operational state like: Optimization/Adaptation are covered by the Self Optimization process In LTE, support for Self-Configuration and Self-Optimization is specified, as described in 3GPP TS 36.300 section 22.2, including features such as Dynamic configuration, Automatic Neighbor Relation ("ANR"), Mobility load balancing, Mobility Robustness Optimization ("MRO"), RACH optimization and support for energy saving.

In NR, support for Self-Configuration and Self-Optimization is specified as well, starting with Self-Configuration features such as Dynamic configuration, Automatic Neighbor Relation ("ANR") in Rel-15, as described in 3GPP TS 38.300 section 15. In NR Rel-16, more SON features are being specified for, including Self-Optimization features such as Mobility Robustness Optimization ("MRO").

Seamless handovers are a key feature of 3GPP technologies. Successful handovers ensure that the UE moves around in the coverage area of different cells without causing too much interruptions in the data transmission. However, there will be scenarios when the network fails to handover the UE to the 'correct' neighbor cell in time and in such scenarios the UE will declare the radio link failure ("RLF") or Handover Failure ("HOF").

Upon HOF and RLF, the UE may take autonomous actions (e.g., trying to select a cell and initiate reestablishment procedure so that we make sure the UE is trying to get back as soon as it can) so that it can be reachable again. The RLF will cause a poor user experience as the RLF is declared by the UE only when it realizes that there is no reliable communication channel (radio link) available between itself and the network. Also, reestablishing the connection requires signaling with the newly selected cell (random access procedure, RRC Reestablishment Request, RRC Reestablishment RRC Reestablishment Complete, RRC Reconfiguration and RRC Reconfiguration Complete) and adds some latency, until the UE can exchange data with the network again.

According to the specifications (3GPP TS 36.331), the possible causes for the radio link failure could be one of the following: (1) Expiry of the radio link monitoring related timer T310; (2) Expiry of the measurement reporting associated timer T312 (not receiving the handover command from the network within this timer's duration despite sending the measurement report when T310 was running); (3) Upon reaching the maximum number of RLC retransmissions; and (4) Upon receiving random access problem indication from the MAC entity.

As RLF/HOF leads to reestablishment which degrades performance and user experience, it is in the interest of the network to understand the reasons for RLF and try to optimize mobility related parameters (e.g., trigger conditions of measurement reports) to avoid later RLFs. Before the standardization of MRO related report handling in the network, only the UE was aware of some information associated to how did the radio quality looked like at the time of RLF, what is the actual reason for declaring RLF etc. For the network to identify the reason for the RLF, the network needs more information, both from the UE and also from the neighboring base stations.

Based on the RLF report from the UE and the knowledge about which cell did the UE reestablished itself, the original source cell can deduce whether the RLF was caused due to a coverage hole or due to handover associated parameter configurations. If the RLF was deemed to be due to handover associated parameter configurations, the original serving cell can further classify the handover related failure as too-early, too-late or handover to wrong cell classes. On the basis of this classification, the original serving cell can properly tune handover parameters and initiate certain measurement reports to avoid/limit the occurrences of RLF/HOF.

As an enhancement to MRO in Rel. 17, 3GPP is going to introduce the successful HO Report ("SHR"). Unlike the RLF report which is used, as described above, to report the RLF or Handover failure experienced by the UE, the SHR is used by the UE to report various information associated to successful HO. The successful HO will not be reported always at every HO, but only when certain triggering conditions are fulfilled. For example, if while doing HO, the T310/T312/T304 timers exceed a certain threshold, then the UE shall store information associated to this HO. Similarly, in case the HO was a DAPS HO, and the UE succeeded with it but an RLF was experienced in the source cell while doing the DAPS HO, then the UE stores information associated to this DAPS HO. When storing the successful handover report, the UE may include various information to aid the network to optimize the handover, such as measurements of the neighboring cells, the fulfilled condition that triggered the successful handover report (e.g. threshold on T310 exceeded, specific RLF issue in the source while doing DAPS HO), etc.

The SHR can be configured by a certain serving cell, and when triggering conditions for SHR logging are fulfilled, the UE stores this information until the NW requests it. In particular, the UE may indicate availability of SHR information in certain RRC message, such as RRCReconfigurationComplete, RRCReestablishmentComplete, RRCSetupComplete, RRCResumeComplete, and the network may request such information via the UEInformationRequest message, upon which the UE transmits the stored SHR in the UEInformationResponse message.

There currently exist certain challenges. For example, while the SHR can be configured by any serving node, the target node to which the UE is handed over may not be aware of such configuration. This might be problematic because if the target node is not able to fetch the SHR generated by the UE during the handover to this target node, then the source cell might not be able to retrieve the SHR. The SHR might be fetched by some other nodes that the UE visits, however, the source node might have interest to retrieve the SHR as soon as possible for the sake of HO optimization. This might be problematic especially in early Rel. 17 network deployments in which not many nodes may support the fetching of the SHR.

Additionally, there might be triggering conditions for the SHR that pertain the target. For example, it would be useful for the target to know whether the beams configured with CFRA for the random access to the target are not the best beams at the time of HO, i.e. the UE performs RACH when accessing the target cell in a beam different than the one configured with CFRA in the HO command. However, as per the current legacy procedure, the target node will not be involved in the configuration by the source node of the SHR to the UE, and similarly when the SHR is fetched by a third network node that will be only transmitted to the source node that configured the SHR, not to the target node.

Another problem is that the SHR configuration configured by the source node will be released at HO completion. This implies that in case the UE is handed-over back by the target node to the source node, i.e. ping-pong effects, the UE may not have anymore a valid SHR configuration to log the possible successful handover performed back towards the source cell.

Certain aspects of the disclosure and their embodiments may provide solutions to these or other challenges. In some embodiments, a first network node (e.g., a source node) and a second network node (e.g., a target node) may exchange information related to a SHR configuration that the first network may provide to the UE prior to the handover towards the target node or when the handover to the target node is commanded. The exchanged information may allow for example the source node to determine whether to configure or not configure the SHR to the UE, and the target node to determine whether additional SHR triggering conditions should be configured as part of the SHR configuration to the UE.

In additional or alternative embodiments, the target node may retrieve the SHR logged by the UE and transmitted to a third network node.

In additional or alternative embodiments, the UE may store an SHR configuration provided by the source node, and keep this registered configuration after successful handover completion to the target node.

In additional or alternative embodiments, the second network node generates the SHR configuration and sends it as part of the handover command that is generated by the second node.

Certain embodiments may provide one or more of the following technical advantages. In some embodiments, the source node is able to determine whether to configure or not configure the SHR to the UE. For example, in case the target node does not support the fetching of the SHR information, then the source node may avoid configuring the SHR to the UE, thereby saving configuration signaling and UE memory consumption.

In additional or alternative embodiments, the target node determines whether additional SHR triggering conditions should be configured as part of the SHR configuration to the UE, and retrieves the SHR in case the SHR is generated by the UE upon fulfilling one or more of the triggering conditions requested by the target. In additional or alternative embodiments, the target node would not need to provide a new SHR configuration after the UE is handed-over to the target. This can be particularly beneficial in case the UE needs to be handed-over back from the target node to the source before receiving a new SHR configuration from the target.

In some embodiments, operations performed by a first network node (e.g., a source node) are provided.

The first network node can transmit an indication (e.g., "SHR configuration request") to a second network node (e.g., a target gNB-CU) related to the SHR configuration that the source network node may provide to a concerned UE. The indication may include a request of whether SHR retrieval is supported by the second network node (e.g., if the second network node can request the SHR in case that is registered by the concerned UE when it is handed-over from the first network node to the second network node). The indication may further include the specific SHR configuration that the source network node intends to configure to the UE (e.g., the SHR triggering conditions including the thresholds on T310/T312/T304 that the source network node intends to set in the SHR configuration). Additionally, as triggering condition the source network node may indicate an "early HO timer" value that the first network node would intend to configure to the UE. The details of the early HO timer are explained in the UE-related embodiments. The "SHR configuration request" may be transmitted over the Xn as part of the HO preparation (e.g., in the Handover Request) or before the HO preparation The first network node can further receive an indication (e.g., a "SHR configuration response") from the second network node (e.g., the target gNB-CU). The indication may include an indication of whether the SHR fetch is supported by the second network node, in case that is registered by the UE when performing the HO from the first network node to the second network node. The indication can further include an additional SHR triggering condition that the second network node may want to configure to the UE (e.g., the second network node may want the UE to register an SHR in case of "beam discrepancy", i.e. the strongest beam measured by the UE at the time of performing random access in a cell controlled by the second network node is not one of the beams for which CFRA resources are configured by the target for the concerned handover). The indication may further include an indication of keeping the SHR configuration even after the successful HO to the target node. For example, this indication may include the "validity time" that the target node may want to set for the concerned SHR configuration, indicating for how long the UE shall maintain the SHR configuration configured by the first network node after being hand-over to the second network node.

The "SHR configuration response" can be transmitted over the Xn as part of the HO preparation (e.g., in the HO Request Acknowledge message) or in another message in response to the "SHR configuration request."

In some embodiments, the target node may not transmit any SHR configuration response, for example, if the target node is not able to request/fetch the SHR registered by the UE. In this example, the absence of the SHR configuration response (e.g., within a certain time window) is interpretated by the first network node as an implicit indication that the target node is not able to request the SHR to the UE.

The first network node can further determine whether the SHR configuration should be configured to the UE. The determination may depend, for example, on whether the target node supports the fetching of the SHR if that is generated by the UE for this HO from the first network node to the second network node The first network node can further transmit, on the basis of the determining action, the SHR configuration to the UE. The SHR configuration may include a first set of triggering conditions selected by the first network node, and optionally a second set of triggering conditions selected by the second network node.

The first network node can further receive the SHR from a third network node, which fetched the SHR from the UE, and optionally transmit it to the second network node (e.g., when the SHR includes information that indicates that it was generated by at least one SHR triggering condition set by the second network node).

In some embodiments, operations performed by a second network node (e.g., a target node) are provided.

The second network node can receive an indication ("SHR configuration request") from a first network node (e.g., a source gNB-CU), as explained above.

The second network node can further determine whether SHR can be fetched in case the UE registers an SHR for the concerned handover from the first network node to the second network node.

The second network node can further transmit an "SHR configuration response" to the first network node which may comprise any of the following information. In some examples, information includes an indication on whether the SHR fetch is supported by the second network node. In some scenarios, the second network node may indicate that SHR fetch after the successful handover of this UE from the first network node to the second network is not supported (e.g., depending on the current load of the cell controlled by the said second network node to which the UE is going to be handed-over). In additional or alternative examples, the information includes additional SHR triggering conditions (e.g., the second network node may want the UE to register an SHR in case of "beam discrepancy", i.e. the beam selected by the UE for the random access in a cell controlled by the second network node when performing the handover, is not one of the beams in which CFRA resources are configured by the target for the concerned handover). In additional or alternative examples, the information includes an indication of keeping the SHR configuration even after the successful HO to the target node, and the indication may include a "validity time" that the target node may want to set for the concerned SHR configuration, indicating for how long the UE shall maintain the SHR configuration configured by the first network node after being hand-over to the second network node.

This indication of keeping the SHR configuration may be requested by the target node in case the target node expects the UE will spend short time in the target node, e.g. in case the cell is in the FR2, or in case ping-pong effects are expected in which case the UE will be handed-over back to the source network node. Hence with this indication, the SHR configuration configured by the first network node may also be applicable for a second handover from the second network node to a third network node, wherein the third network node may be a second network node (in case of ping-pong) or a network node different from the first and the second network node.

For example, in case the target node determines that this UE may be handed-over back to the source node, i.e. ping pong effect, the target node may request the source node to indicate to the UE that the UE shall keep the SHR configuration also after the successful of the first handover to the target node, and in case the UE is handed-over back to the source node with a second handover, the UE shall apply the SHR configuration previously configured by the source before the first handover. This decision on whether to provide the indication of keeping the SHR configuration, may depend also on the triggering conditions (e.g. on the thresholds on T310/T312/T304) that the source node intends to configure to the UE and indicated by the source node in the action (201). For example, if the T310/T312/T304 adopted by the source node for the first handover are not the same as the ones the target node would adopt for the second handover from the target node to the third network node, the target node may not request the source node to request the UE to keep the SHR configuration.

The second network node can receive from a third network node the SHR that the third network node has fetched from the UE. This reception may only occur in case the target node requested the first network node to include certain triggering conditions in the SHR configuration for the concerned UE. In an alternative method, the SHR is received directly from the source network node, in case the third network node sends the SHR only to the source node.

In some embodiments, operations performed by a third network node (e.g., the node receiving the SHR from the UE) are provided. In some examples, the third network node is a network node capable of requesting to the UE the SHR that the UE previously registered upon handover from the first network node to the second network node. The third network node may inspect the SHR transmitted by the UE and determine whether that should be only transmitted to the first network node (e.g., the source node) or to both first network node and second network node (e.g., the target node). For example if the UE generated the SHR upon fulfilling triggering conditions set by the source then the SHR is only sent via Xn to the first network node, otherwise if the SHR was generated by triggering conditions set by the target node, then the third network node may send the SHR to both the source and target node. The third network node may determine whether a certain SHR was generated by triggering conditions set by the target via a field indicated in the SHR transmitted by the UE. For example, the UE may indicate the one or more specific triggering conditions that generated this SHR and the cell ID of the target cell. If such indicated triggering conditions are the ones of the target, e.g., "beam discrepancy" or if the UE indicates that a handover to a third network node occurred while the "validity time" set by the target was running, then the third network node send the SHR to both the first network node and second network node.

In additional or alternative embodiments, the third network node only sends the SHR to the first network node, irrespective of the triggering condition(s) that generated the SHR.

In some embodiments, operations are performed by a UE. The UE can receive the SHR configuration from the first network node. The SHR configuration can include triggering conditions determined by the first network node and optionally determined by the second network node. The UE can further apply the provisioned SHR configuration, and register/store the SHR if one or more of the triggering conditions are fulfilled when performing the handover from the first to the second network node In some examples, the SHR configuration provisioned by the first network node is released when the handover from the first to the second network node is successful. In some other cases, it is kept even after the successful handover to the second network node. Whether to release or not the SHR configuration upon successful handover may depend on the parameters provided in the SHR configuration. For example, if the SHR configuration contains a value for the "validity time" provisioned by the target node as per the method (203), the UE shall maintain the SHR configuration after being hand-over to the second network node. The UE may indicate in the SHR if an handover to a third network node occurred while the "validity time" set by the target was running.

If a value for the "early HO timer" is configured by the source node, the UE may start the "early HO timer" upon successful handover, or when the handover from the first to the second network node is executed. If a second handover from the second network node to a third network node is triggered before the early HO timer reaches the said configured value, the UE registers (stores) the SHR. This SHR would be used by the first network node to determine whether a UE experienced a too early HO in the target cell.

The UE can further transmit to a third network node the SHR when requested

9999FIG. 910FIG. 10131313FIG. 1314FIG. 1410FIG. 1010FIG. 10101099FIG. 911FIG. 1114FIG. 1410FIG. 1013FIG. 1310FIG. 999FIG. 911FIG. 11131313FIG. 1314FIG. 141111FIG. 1111FIG. 1111FIG. 1111FIG. 119FIG. 9131313FIG. 13 In the description that follows, while the communication device may be any of the wireless device 912A, 912B, wired or wireless devices UE 912C, UE 912D, UE 1000, virtualization hardware 1304, virtual machines 1308A, 1308B, or UE 1406, the communication device 1000 shall be used to describe the functionality of the operations of the communication device. Operations of the communication device 1000 (implemented using the structure of the block diagram of FIG. 10) will now be discussed with reference to the flow chart of FIG. 5 according to some embodiments of inventive concepts. For example, modules may be stored in memory 1010 of FIG. 10, and these modules may provide instructions so that when the instructions of a module are executed by respective communication device processing circuitry 1002, processing circuitry 1002 performs respective operations of the flow chart.

Figure 5:
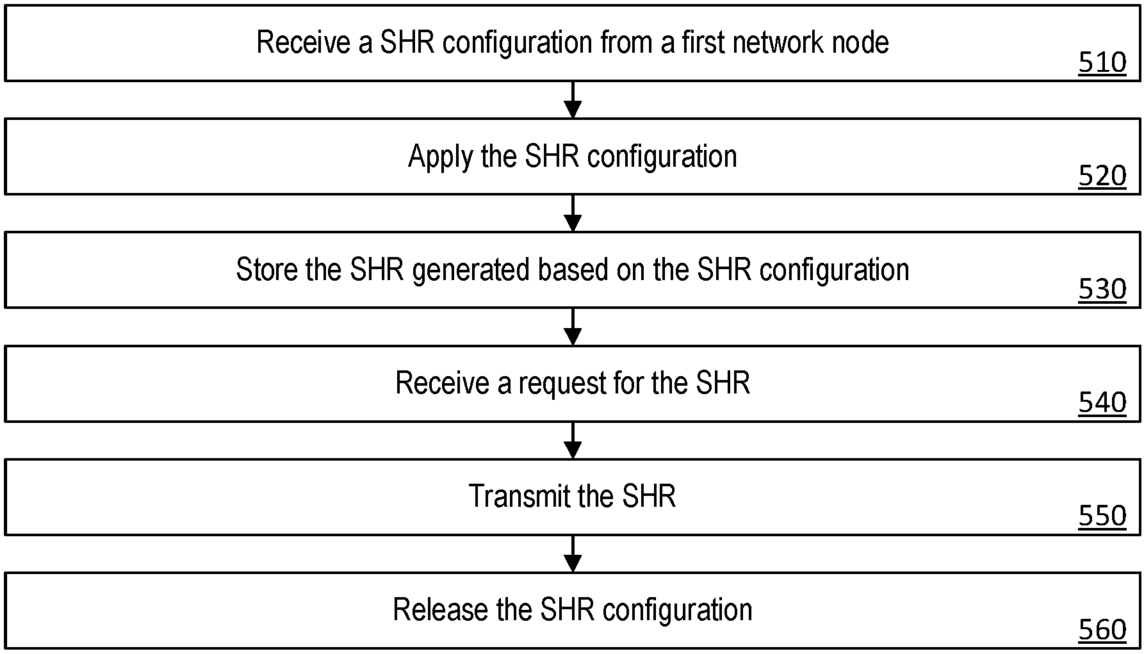
FIG. 5 is a flow chart illustrating an example of operations of a communication device for configuring a SHR according to some embodiments of inventive concepts.

FIG. 5 illustrates an example of operations performed by a communication device for configuration of a successful handover report ("SHR").

At block 510, processing circuitry 1002 receives, via communication interface 1012, a SHR configuration from a first network node. In some embodiments, the SHR configuration includes a triggering condition.

At block 520, processing circuitry 1002 applies the SHR configuration. In some embodiments, applying the SHR configuration includes storing the SHR configuration.

At block 530, processing circuitry 1002 stores the SHR generated based on the SHR configuration. In some embodiments, the SHR is stored in response to the triggering condition being satisfied during a handover of the communication device from the first network node to a second network node.

In additional or alternative embodiments, the SHR configuration includes an early handover timer and storing the SHR includes, responsive to a handover of the communication device from the second network node to a third network node prior to expiration of the early handover timer, storing the SHR.

At block 540, processing circuitry 1002 receives, via communication interface 1012, a request for the SHR.

At block 550, processing circuitry 1002 transmits, via communication interface 1012, the SHR.

At block 560, processing circuitry 1002 releases the SHR configuration. In some embodiments, the SHR configuration includes a validity timer and releasing the SHR configuration includes, responsive to expiration of the validity timer, releasing the SHR configuration.

Various operations from the flow chart of FIG. 5 may be optional with respect to some embodiments of communication devices and related methods. Regarding methods of some embodiments, operations of blocks 540, 550, and 560 of FIG. 5 may be optional.

In the description that follows, while the network node may be any of the network node 910A, 910B, 1100, 1404, hardware 1304, or virtual machine 1308A, 1308B, the network node 1100 shall be used to describe the functionality of the operations of the network node. Operations of the network node 1100 (implemented using the structure of FIG. 11) will now be discussed with reference to the flow charts of FIGS. 6-8 according to some embodiments of inventive concepts. For example, modules may be stored in memory 1104 of FIG. 11, and these modules may provide instructions so that when the instructions of a module are executed by respective network node processing circuitry 1102, processing circuitry 1102 performs respective operations of the flow charts.

Figure 6:
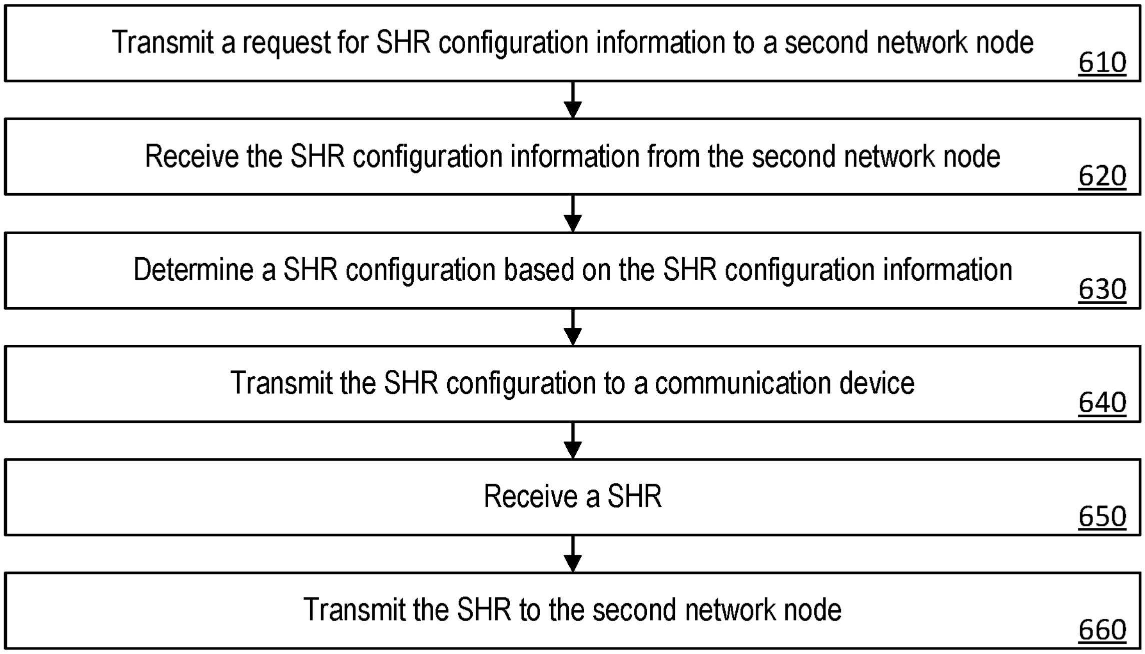
FIG. 6 is a flow chart illustrating an example of operations of a first network node (e.g., a source node) for configuring a SHR according to some embodiments of inventive concepts.

FIG. 6 illustrates an example of operations performed by a first network node (e.g., a source node) for configuration of a successful handover report.

At block 610, processing circuitry 1102 transmits, via communication interface 1106, a request for SHR configuration information to a second network node. In some embodiments, the first network node is a source node for a handover of a communication device and the second network node is a target node for the handover of the communication device. In additional or alternative embodiments, transmitting the request for SHR configuration information includes transmitting at least one of: a request of whether SHR retrieval is supported by the second network node; and a proposed SHR configuration that the first network node plans to provide to the communication device. In some examples, the proposed SHR configuration includes at least one of: an indication of a triggering condition selected by the first network node; and an indication of an amount of time after the handover during which the communication device is to store the SHR if the communication device is handed over to a third network node.

In additional or alternative embodiments, transmitting the request for SHR configuration information includes transmitting the request for SHR configuration information via a Xn interface as part of preparation for the handover.

At block 620, processing circuitry 1102 receives, via communication interface 1106, the SHR configuration information from the second network node. In some embodiments, the SHR configuration information associated with the communication device. In additional or alternative embodiments, receiving the SHR configuration information includes receiving at least one of: an indication of whether the second network node is capable of SHR retrieval; an indication of a triggering condition selected by the second network node; and an indication of an amount of time the communication device is to maintain the SHR configuration after the handover.

In additional or alternative embodiments, receiving the SHR configuration information includes receiving the SHR configuration information via the Xn interface as part of the preparation for the handover.

At block 630, processing circuitry 1102 determines a SHR configuration based on the SHR configuration information. In some embodiments, determining the SHR configuration includes determining the SHR configuration to include a triggering condition selected by the first network node. In additional or alternative embodiments, the SHR configuration information includes an indication of a triggering condition selected by the second network node, and determining the SHR configuration includes determining the SHR configuration to include the triggering condition selected by the second network node.

At block 640, processing circuitry 1102 transmits, via communication interface 1106, the SHR configuration to a communication device.

At block 650, processing circuitry 1102 receives, via communication interface 1106, the SHR.

At block 660, processing circuitry 1102 transmits, via communication interface 1106, the SHR to the second network node. In some embodiments, transmitting the SHR to the second network node includes transmitting the SHR to the second network node in response to determining that the SHR includes an indication that the SHR was generated in response to a triggering condition included in the SHR configuration information.

Figure 7:
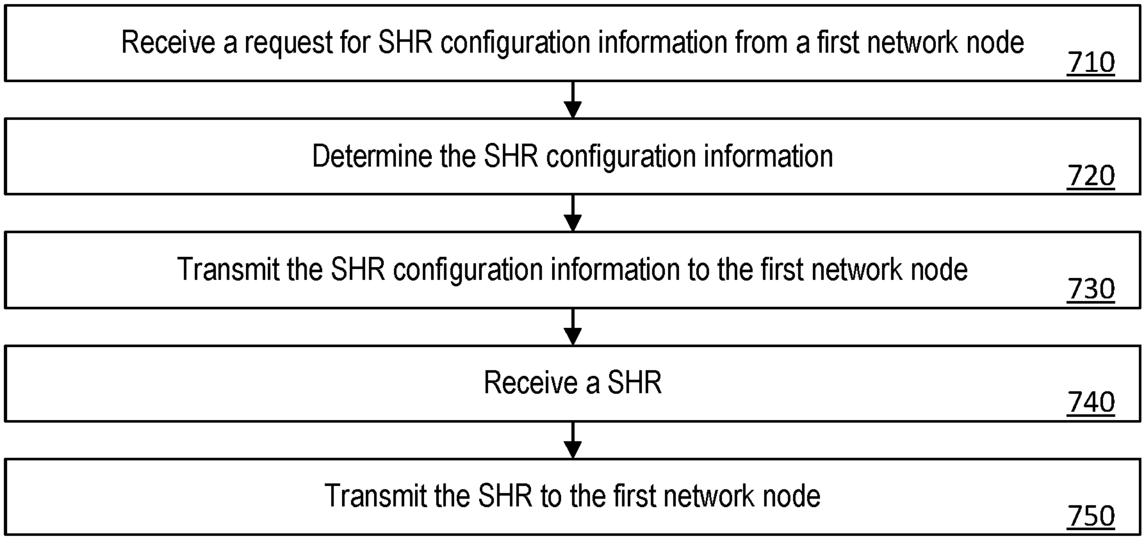
FIG. 7 is a flow chart illustrating an example of operations of a second network node (e.g., a target node) for configuring a SHR according to some embodiments of inventive concepts.

FIG. 7 illustrates an example of operations performed by a second network node (e.g., a target node) for configuration of a successful handover report.

At block 710, processing circuitry 1102 receives, via communication interface 1106, a request for SHR configuration information from a first network node. In some embodiments, the first network node is a source node for a handover of a communication device and the second network node is a target node for the handover of the communication device.

In additional or alternative embodiments, receiving the request for SHR configuration information includes receiving at least one of: a request of whether SHR retrieval is supported by the second network node; and a proposed SHR configuration that the first network node plans to provide to the communication device. In some examples, the proposed SHR configuration includes at least one of: an indication of a triggering condition selected by the first network node; and an indication of an amount of time after the handover during which the communication device is to store the SHR if the communication device is handed over to a third network node.

In additional or alternative embodiments, receiving the request for SHR configuration information includes receiving the request for SHR configuration information via a Xn interface as part of preparation for the handover.

At block 720, processing circuitry 1102 determines the SHR configuration information. In some embodiments, determining the SHR configuration information includes determining at least one of: whether the SHR is retrievable if the communication device registers the SHR for the handover; a triggering condition selected by the second network node; and an amount of time the communication device is to maintain the SHR configuration after the handover.

At block 730, processing circuitry 1102 transmits, via communication interface 1106, the SHR configuration information to the first network node. In some embodiments, transmitting the SHR configuration information includes transmitting at least one of: an indication of whether the second network node is capable of SHR retrieval; an indication of a triggering condition selected by the second network node; and an indication of an amount of time the communication device is to maintain the SHR configuration after the handover.

In additional or alternative embodiments, transmitting the SHR configuration information includes transmitting the SHR configuration information via the Xn interface as part of the preparation for the handover.

At block 740, processing circuitry 1102 receives, via transceiver 601, a SHR.

At block 750, processing circuitry 1102 transmits, via transceiver 601, the SHR to the first network node.

Figure 8:
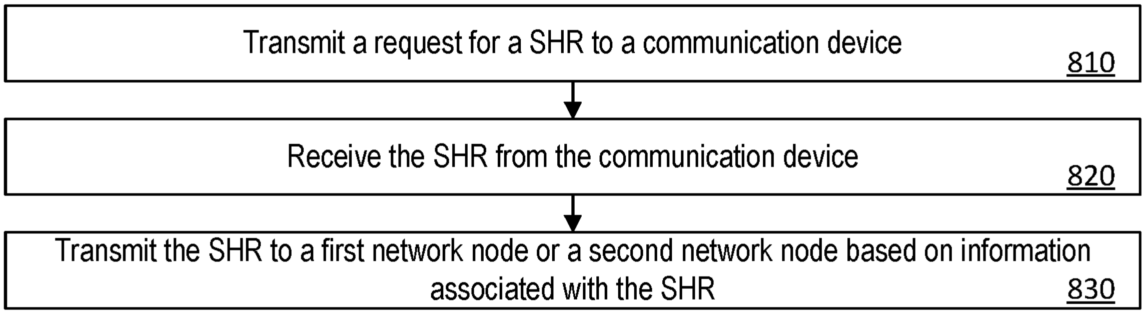
FIG. 8 is a flow chart illustrating an example of operations of a third network node for handling a SHR according to some embodiments of inventive concepts.

FIG. 8 illustrates an example of operations performed by a third network node for handling a successful handover report.

At block 810, processing circuitry 1102 transmits, via communication interface 1106, a request for a SHR to a communication device.

At block 820, processing circuitry 1102 receives, via communication interface 1106, the SHR from the communication device. In some embodiments, the SHR is associated with a handover of the communication device between a first network node and a second network node.

At block 830, processing circuitry 1102 transmits, via communication interface 1106, the SHR to a first network node or a second network node based on information associated with the SHR. In some embodiments, the information associated with the SHR includes an indication of a triggering condition that caused the communication device to store the SHR, and transmitting the SHR includes transmitting the SHR to either the first network node or the second network node based on which of the first network node and the second network node selected the triggering condition.

Various operations from the flow chart of FIGS. 6-8 may be optional with respect to some embodiments of RAN nodes and related methods. Regarding methods of some embodiments, for example, operations of blocks 650 and 660 of FIG. 6 may be optional. Regarding methods of additional or alternative embodiments, for example, operations of blocks 740 and 750 of FIG. 7 may be optional. Regarding methods of additional or alternative embodiments, for example, operations of block 810 of FIG. 8 may be optional.

Figure 9:
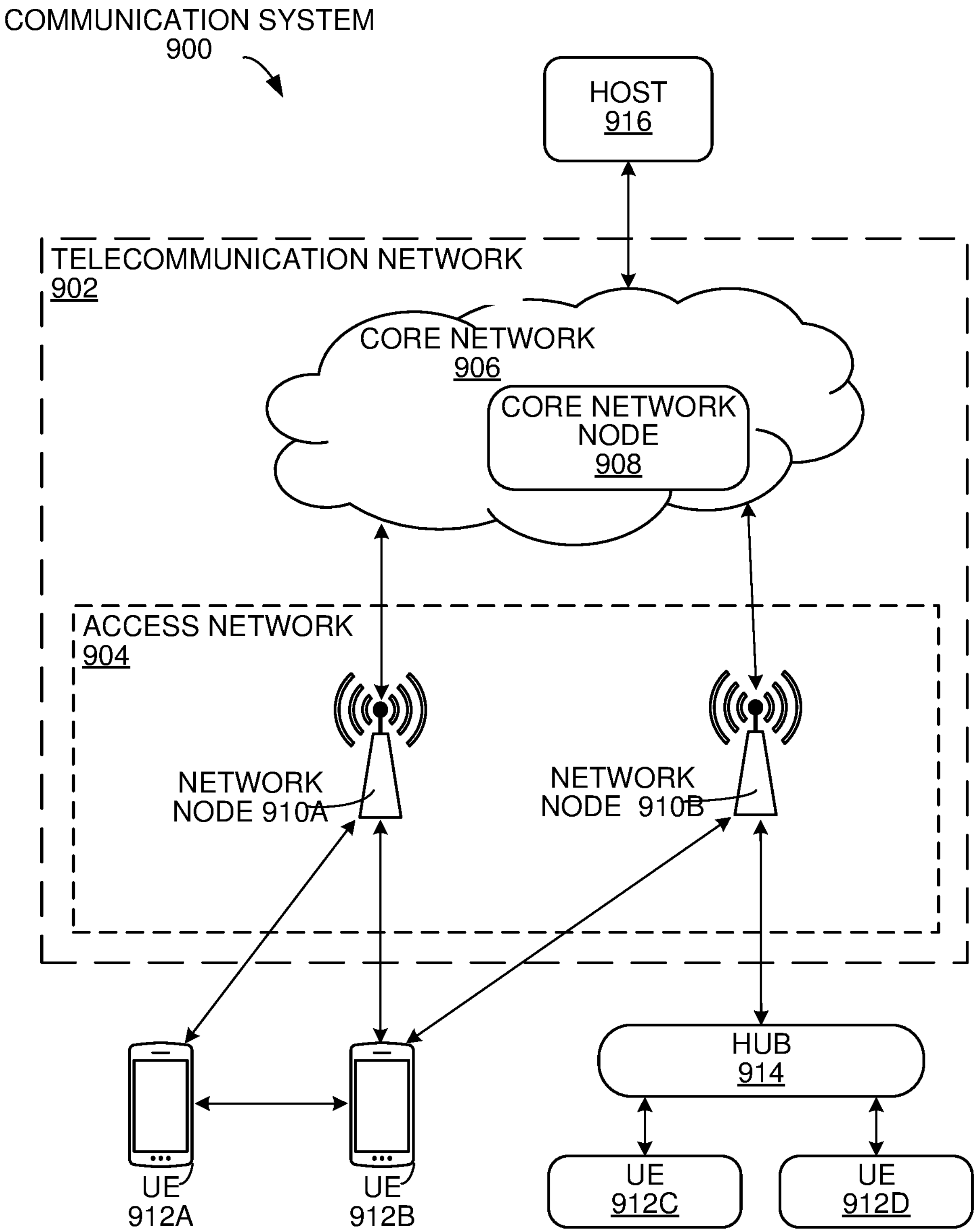
FIG. 9 is a block diagram of a communication system in accordance with some embodiments.

FIG. 9 shows an example of a communication system 900 in accordance with some embodiments.

In the example, the communication system 900 includes a telecommunication network 902 that includes an access network 904, such as a radio access network (RAN), and a core network 906, which includes one or more core network nodes 908. The access network 904 includes one or more access network nodes, such as network nodes 910*a* and 910*b* (one or more of which may be generally referred to as network nodes 910), or any other similar 3$^{rd}$ Generation Partnership Project (3GPP) access node or non-3GPP access point. The network nodes 910 facilitate direct or indirect connection of user equipment (UE), such as by connecting UEs 912*a*, 912*b*, 912*c*, and 912*d* (one or more of which may be generally referred to as UEs 912) to the core network 906 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 900 may include any number of wired or wireless networks, network nodes, UEs, and/or any other components or systems that may facilitate or participate in the communication of data and/or signals whether via wired or wireless connections. The communication system 900 may include and/or interface with any type of communication, telecommunication, data, cellular, radio network, and/or other similar type of system.

The UEs 912 may be any of a wide variety of communication devices, including wireless devices arranged, configured, and/or operable to communicate wirelessly with the network nodes 910 and other communication devices. Similarly, the network nodes 910 are arranged, capable, configured, and/or operable to communicate directly or indirectly with the UEs 912 and/or with other network nodes or equipment in the telecommunication network 902 to enable and/or provide network access, such as wireless network access, and/or to perform other functions, such as administration in the telecommunication network 902.

In the depicted example, the core network 906 connects the network nodes 910 to one or more hosts, such as host 916. These connections may be direct or indirect via one or more intermediary networks or devices. In other examples, network nodes may be directly coupled to hosts. The core network 906 includes one more core network nodes (e.g., core network node 908) that are structured with hardware and software components. Features of these components may be substantially similar to those described with respect to the UEs, network nodes, and/or hosts, such that the descriptions thereof are generally applicable to the corresponding components of the core network node 908. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 916 may be under the ownership or control of a service provider other than an operator or provider of the access network 904 and/or the telecommunication network 902, and may be operated by the service provider or on behalf of the service provider. The host 916 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 900 of FIG. 9 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 902 is a cellular network that implements 3GPP standardized features. Accordingly, the telecommunications network 902 may support network slicing to provide different logical networks to different devices that are connected to the telecommunication network 902. For example, the telecommunications network 902 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 912 are configured to transmit and/or receive information without direct human interaction. For instance, a UE may be designed to transmit information to the access network 904 on a predetermined schedule, when triggered by an internal or external event, or in response to requests from the access network 904. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 914 communicates with the access network 904 to facilitate indirect communication between one or more UEs (e.g., UE 912*c* and/or 912*d*) and network nodes (e.g., network node 910*b*). In some examples, the hub 914 may be a controller, router, content source and analytics, or any of the other communication devices described herein regarding UEs. For example, the hub 914 may be a broadband router enabling access to the core network 906 for the UEs. As another example, the hub 914 may be a controller that sends commands or instructions to one or more actuators in the UEs. Commands or instructions may be received from the UEs, network nodes 910, or by executable code, script, process, or other instructions in the hub 914. As another example, the hub 914 may be a data collector that acts as temporary storage for UE data and, in some embodiments, may perform analysis or other processing of the data. As another example, the hub 914 may be a content source. For example, for a UE that is a VR headset, display, loudspeaker or other media delivery device, the hub 914 may retrieve VR assets, video, audio, or other media or data related to sensory information via a network node, which the hub 914 then provides to the UE either directly, after performing local processing, and/or after adding additional local content. In still another example, the hub 914 acts as a proxy server or orchestrator for the UEs, in particular in if one or more of the UEs are low energy IoT devices.

The hub 914 may have a constant/persistent or intermittent connection to the network node 910*b*. The hub 914 may also allow for a different communication scheme and/or schedule between the hub 914 and UEs (e.g., UE 912*c* and/or 912*d*), and between the hub 914 and the core network 906. In other examples, the hub 914 is connected to the core network 906 and/or one or more UEs via a wired connection. Moreover, the hub 914 may be configured to connect to an M2M service provider over the access network 904 and/or to another UE over a direct connection. In some scenarios, UEs may establish a wireless connection with the network nodes 910 while still connected via the hub 914 via a wired or wireless connection. In some embodiments, the hub 914 may be a dedicated hub—that is, a hub whose primary function is to route communications to/from the UEs from/to the network node 910*b*. In other embodiments, the hub 914 may be a non-dedicated hub—that is, a device which is capable of operating to route communications between the UEs and network node 910*b*, but which is additionally capable of operating as a communication start and/or end point for certain data channels.

Figure 10:
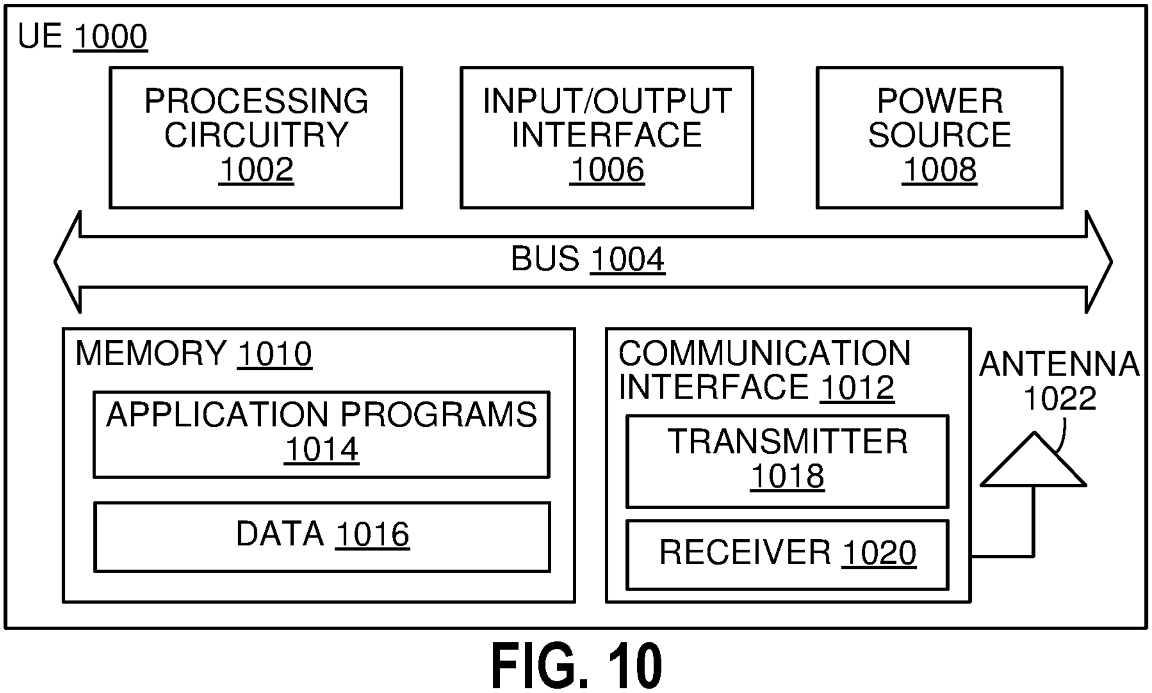
FIG. 10 is a block diagram of a user equipment in accordance with some embodiments

FIG. 10 shows a UE 1000 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1000 includes processing circuitry 1002 that is operatively coupled via a bus 1004 to an input/output interface 1006, a power source 1008, a memory 1010, a communication interface 1012, and/or any other component, or any combination thereof. Certain UEs may utilize all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry 1002 is configured to process instructions and data and may be configured to implement any sequential state machine operative to execute instructions stored as machine-readable computer programs in the memory 1010. The processing circuitry 1002 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1002 may include multiple central processing units (CPUs).

In the example, the input/output interface 1006 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1000. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1008 is structured as a battery or battery pack. Other types of power sources, such as an external power source (e.g., an electricity outlet), photovoltaic device, or power cell, may be used. The power source 1008 may further include power circuitry for delivering power from the power source 1008 itself, and/or an external power source, to the various parts of the UE 1000 via input circuitry or an interface such as an electrical power cable. Delivering power may be, for example, for charging of the power source 1008. Power circuitry may perform any formatting, converting, or other modification to the power from the power source 1008 to make the power suitable for the respective components of the UE 1000 to which power is supplied.

The memory 1010 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1010 includes one or more application programs 1014, such as an operating system, web browser application, a widget, gadget engine, or other application, and corresponding data 1016. The memory 1010 may store, for use by the UE 1000, any of a variety of various operating systems or combinations of operating systems.

The memory 1010 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1010 may allow the UE 1000 to access instructions, application programs and the like, stored on transitory or non-transitory memory media, to off-load data, or to upload data. An article of manufacture, such as one utilizing a communication system may be tangibly embodied as or in the memory 1010, which may be or comprise a device-readable storage medium.

The processing circuitry 1002 may be configured to communicate with an access network or other network using the communication interface 1012. The communication interface 1012 may comprise one or more communication subsystems and may include or be communicatively coupled to an antenna 1022. The communication interface 1012 may include one or more transceivers used to communicate, such as by communicating with one or more remote transceivers of another device capable of wireless communication (e.g., another UE or a network node in an access network). Each transceiver may include a transmitter 1018 and/or a receiver 1020 appropriate to provide network communications (e.g., optical, electrical, frequency allocations, and so forth). Moreover, the transmitter 1018 and receiver 1020 may be coupled to one or more antennas (e.g., antenna 1022) and may share circuit components, software or firmware, or alternatively be implemented separately.

In the illustrated embodiment, communication functions of the communication interface 1012 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1012, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1000 shown in FIG. 10.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 11:
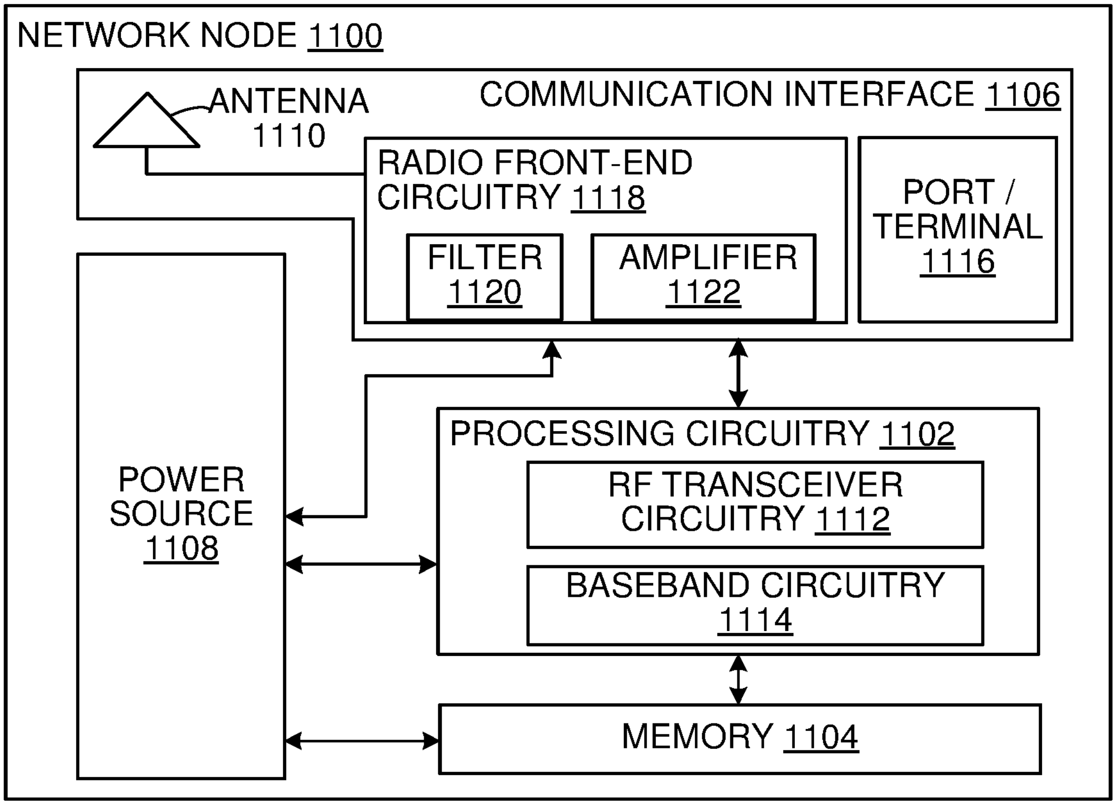
FIG. 11 is a block diagram of a network node in accordance with some embodiments.

FIG. 11 shows a network node 1100 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1100 includes a processing circuitry 1102, a memory 1104, a communication interface 1106, and a power source 1108. The network node 1100 may be composed of multiple physically separate components (e.g., a NodeB component and a RNC component, or a BTS component and a BSC component, etc.), which may each have their own respective components. In certain scenarios in which the network node 1100 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1100 may be configured to support multiple radio access technologies (RATs). In such embodiments, some components may be duplicated (e.g., separate memory 1104 for different RATs) and some components may be reused (e.g., a same antenna 1110 may be shared by different RATs). The network node 1100 may also include multiple sets of the various illustrated components for different wireless technologies integrated into network node 1100, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1100.

The processing circuitry 1102 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1100 components, such as the memory 1104, to provide network node 1100 functionality.

In some embodiments, the processing circuitry 1102 includes a system on a chip (SOC). In some embodiments, the processing circuitry 1102 includes one or more of radio frequency (RF) transceiver circuitry 1112 and baseband processing circuitry 1114. In some embodiments, the radio frequency (RF) transceiver circuitry 1112 and the baseband processing circuitry 1114 may be on separate chips (or sets of chips), boards, or units, such as radio units and digital units. In alternative embodiments, part or all of RF transceiver circuitry 1112 and baseband processing circuitry 1114 may be on the same chip or set of chips, boards, or units.

The memory 1104 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1102. The memory 1104 may store any suitable instructions, data, or information, including a computer program, software, an application including one or more of logic, rules, code, tables, and/or other instructions capable of being executed by the processing circuitry 1102 and utilized by the network node 1100. The memory 1104 may be used to store any calculations made by the processing circuitry 1102 and/or any data received via the communication interface 1106. In some embodiments, the processing circuitry 1102 and memory 1104 is integrated.

The communication interface 1106 is used in wired or wireless communication of signaling and/or data between a network node, access network, and/or UE. As illustrated, the communication interface 1106 comprises port(s)/terminal(s) 1116 to send and receive data, for example to and from a network over a wired connection. The communication interface 1106 also includes radio front-end circuitry 1118 that may be coupled to, or in certain embodiments a part of, the antenna 1110. Radio front-end circuitry 1118 comprises filters 1120 and amplifiers 1122. The radio front-end circuitry 1118 may be connected to an antenna 1110 and processing circuitry 1102. The radio front-end circuitry may be configured to condition signals communicated between antenna 1110 and processing circuitry 1102. The radio front-end circuitry 1118 may receive digital data that is to be sent out to other network nodes or UEs via a wireless connection. The radio front-end circuitry 1118 may convert the digital data into a radio signal having the appropriate channel and bandwidth parameters using a combination of filters 1120 and/or amplifiers 1122. The radio signal may then be transmitted via the antenna 1110. Similarly, when receiving data, the antenna 1110 may collect radio signals which are then converted into digital data by the radio front-end circuitry 1118. The digital data may be passed to the processing circuitry 1102. In other embodiments, the communication interface may comprise different components and/or different combinations of components.

In certain alternative embodiments, the network node 1100 does not include separate radio front-end circuitry 1118, instead, the processing circuitry 1102 includes radio front-end circuitry and is connected to the antenna 1110. Similarly, in some embodiments, all or some of the RF transceiver circuitry 1112 is part of the communication interface 1106. In still other embodiments, the communication interface 1106 includes one or more ports or terminals 1116, the radio front-end circuitry 1118, and the RF transceiver circuitry 1112, as part of a radio unit (not shown), and the communication interface 1106 communicates with the baseband processing circuitry 1114, which is part of a digital unit (not shown).

The antenna 1110 may include one or more antennas, or antenna arrays, configured to send and/or receive wireless signals. The antenna 1110 may be coupled to the radio front-end circuitry 1118 and may be any type of antenna capable of transmitting and receiving data and/or signals wirelessly. In certain embodiments, the antenna 1110 is separate from the network node 1100 and connectable to the network node 1100 through an interface or port.

The antenna 1110, communication interface 1106, and/or the processing circuitry 1102 may be configured to perform any receiving operations and/or certain obtaining operations described herein as being performed by the network node. Any information, data and/or signals may be received from a UE, another network node and/or any other network equipment. Similarly, the antenna 1110, the communication interface 1106, and/or the processing circuitry 1102 may be configured to perform any transmitting operations described herein as being performed by the network node. Any information, data and/or signals may be transmitted to a UE, another network node and/or any other network equipment.

The power source 1108 provides power to the various components of network node 1100 in a form suitable for the respective components (e.g., at a voltage and current level needed for each respective component). The power source 1108 may further comprise, or be coupled to, power management circuitry to supply the components of the network node 1100 with power for performing the functionality described herein. For example, the network node 1100 may be connectable to an external power source (e.g., the power grid, an electricity outlet) via an input circuitry or interface such as an electrical cable, whereby the external power source supplies power to power circuitry of the power source 1108. As a further example, the power source 1108 may comprise a source of power in the form of a battery or battery pack which is connected to, or integrated in, power circuitry. The battery may provide backup power should the external power source fail.

Embodiments of the network node 1100 may include additional components beyond those shown in FIG. 11 for providing certain aspects of the network node's functionality, including any of the functionality described herein and/or any functionality necessary to support the subject matter described herein. For example, the network node 1100 may include user interface equipment to allow input of information into the network node 1100 and to allow output of information from the network node 1100. This may allow a user to perform diagnostic, maintenance, repair, and other administrative functions for the network node 1100.

Figure 12:
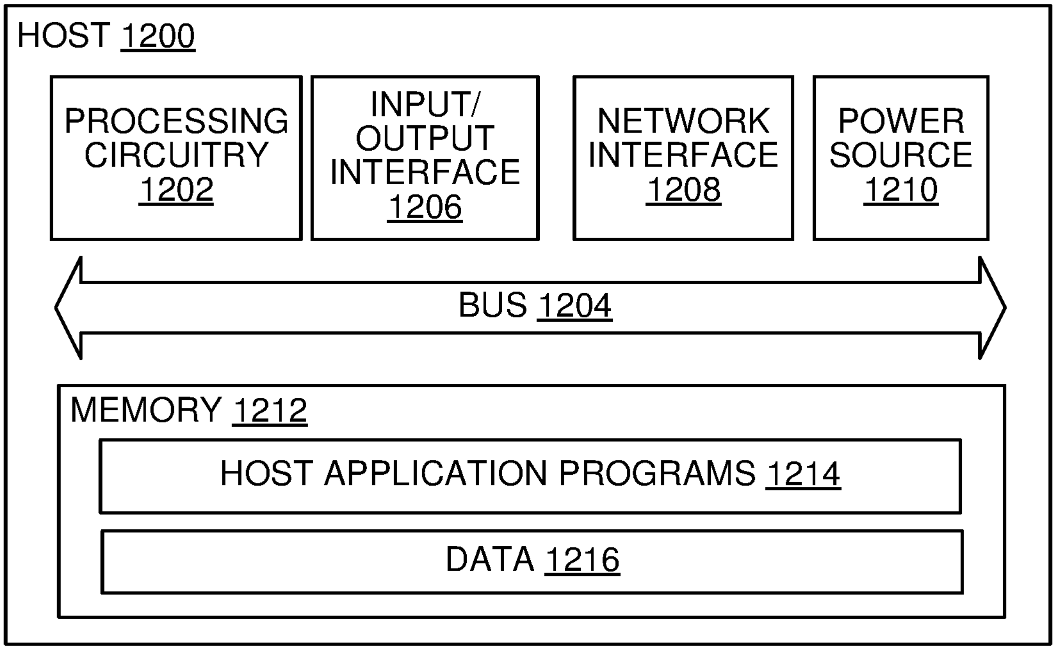
FIG. 12 is a block diagram of a host computer communicating with a user equipment in accordance with some embodiments.

FIG. 12 is a block diagram of a host 1200, which may be an embodiment of the host 916 of FIG. 9, in accordance with various aspects described herein. As used herein, the host 1200 may be or comprise various combinations hardware and/or software, including a standalone server, a blade server, a cloud-implemented server, a distributed server, a virtual machine, container, or processing resources in a server farm. The host 1200 may provide one or more services to one or more UEs.

The host 1200 includes processing circuitry 1202 that is operatively coupled via a bus 1204 to an input/output interface 1206, a network interface 1208, a power source 1210, and a memory 1212. Other components may be included in other embodiments. Features of these components may be substantially similar to those described with respect to the devices of previous figures, such as FIGS. 10 and 11, such that the descriptions thereof are generally applicable to the corresponding components of host 1200.

The memory 1212 may include one or more computer programs including one or more host application programs 1214 and data 1216, which may include user data, e.g., data generated by a UE for the host 1200 or data generated by the host 1200 for a UE. Embodiments of the host 1200 may utilize only a subset or all of the components shown. The host application programs 1214 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1214 may also provide for user authentication and licensing checks and may periodically report health, routes, and content availability to a central node, such as a device in or on the edge of a core network. Accordingly, the host 1200 may select and/or indicate a different host for over-the-top services for a UE. The host application programs 1214 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 13:
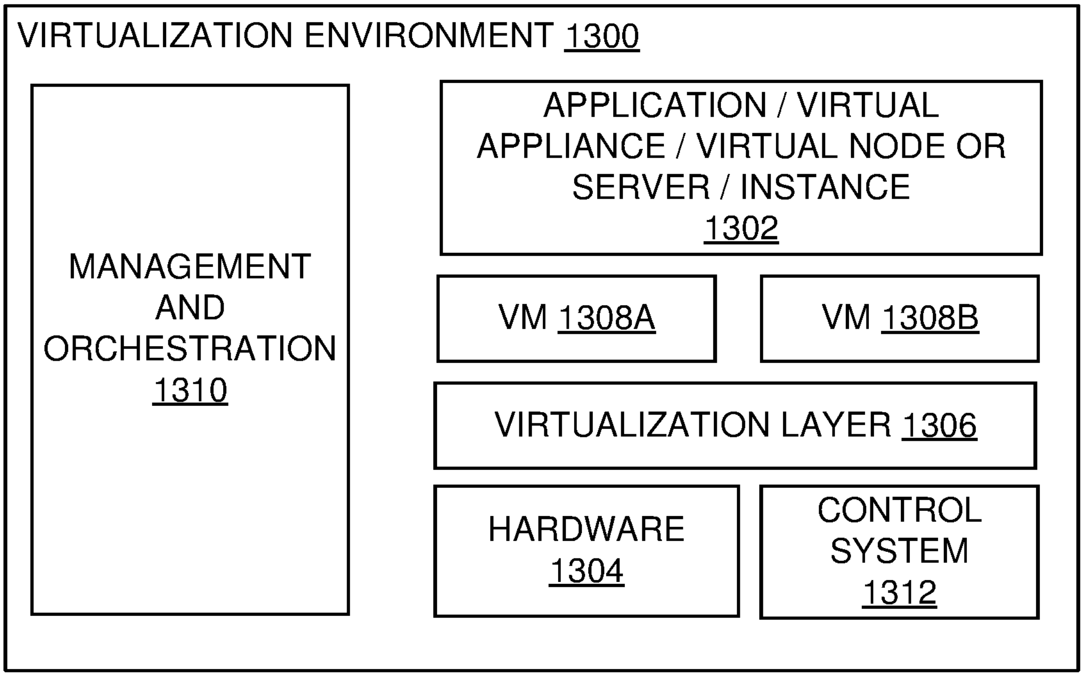
FIG. 13 is a block diagram of a virtualization environment in accordance with some embodiments.

FIG. 13 is a block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1300 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1302 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1304 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1306 (also referred to as hypervisors or virtual machine monitors (VMMs)), provide VMs 1308*a* and 1308*b* (one or more of which may be generally referred to as VMs 1308), and/or perform any of the functions, features and/or benefits described in relation with some embodiments described herein. The virtualization layer 1306 may present a virtual operating platform that appears like networking hardware to the VMs 1308.

The VMs 1308 comprise virtual processing, virtual memory, virtual networking or interface and virtual storage, and may be run by a corresponding virtualization layer 1306. Different embodiments of the instance of a virtual appliance 1302 may be implemented on one or more of VMs 1308, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1308 may be a software implementation of a physical machine that runs programs as if they were executing on a physical, non-virtualized machine. Each of the VMs 1308, and that part of hardware 1304 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1308 on top of the hardware 1304 and corresponds to the application 1302.

Hardware 1304 may be implemented in a standalone network node with generic or specific components. Hardware 1304 may implement some functions via virtualization. Alternatively, hardware 1304 may be part of a larger cluster of hardware (e.g. such as in a data center or CPE) where many hardware nodes work together and are managed via management and orchestration 1310, which, among others, oversees lifecycle management of applications 1302. In some embodiments, hardware 1304 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1312 which may alternatively be used for communication between hardware nodes and radio units.

Figure 14:
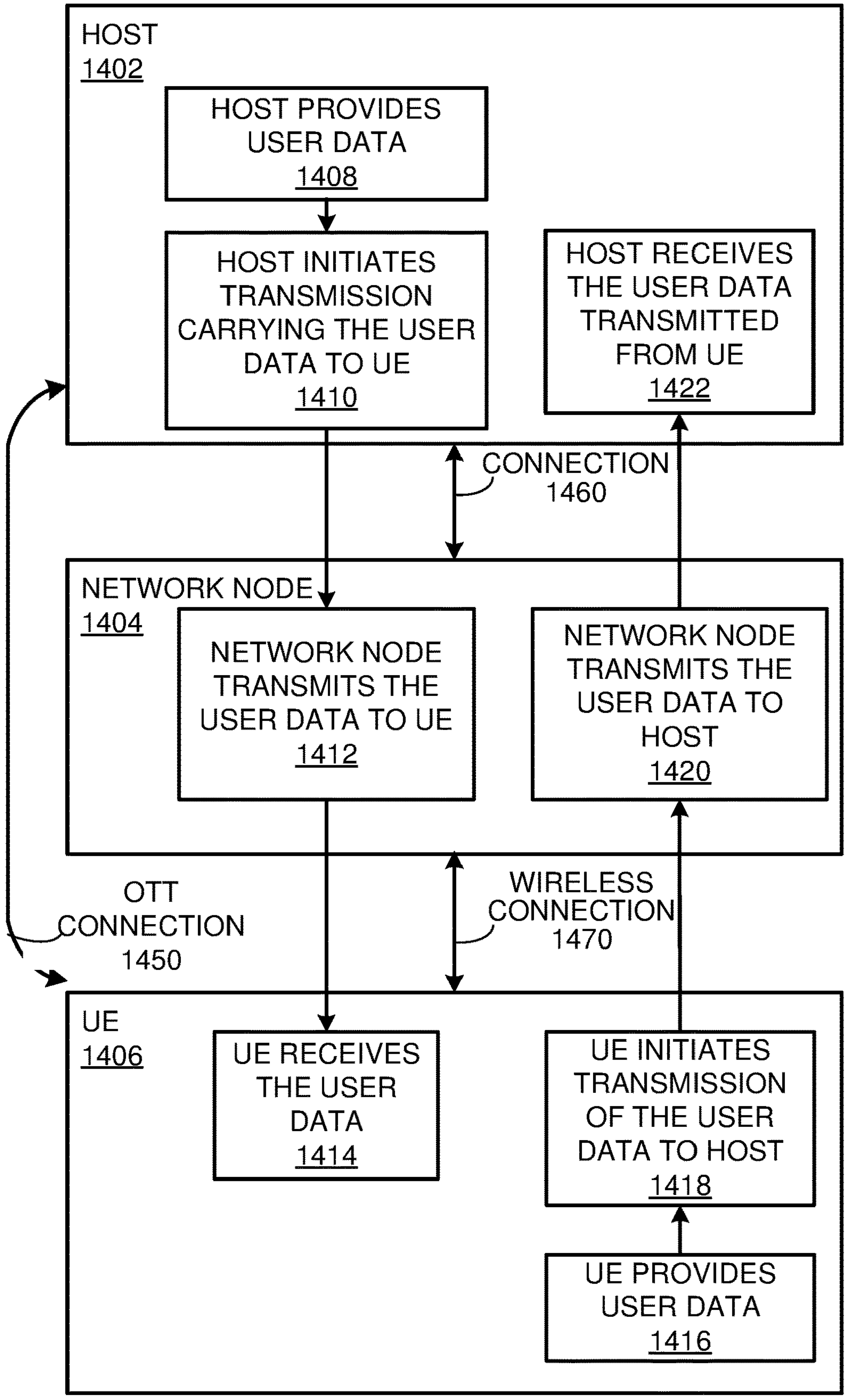
FIG. 14 is a block diagram of a host computer communicating via a base station with a user equipment over a partially wireless connection in accordance with some embodiments in accordance with some embodiments.

FIG. 14 shows a communication diagram of a host 1402 communicating via a network node 1404 with a UE 1406 over a partially wireless connection in accordance with some embodiments. Example implementations, in accordance with various embodiments, of the UE (such as a UE 912*a* of FIG. 9 and/or UE 1000 of FIG. 10), network node (such as network node 910*a* of FIG. 9 and/or network node 1100 of FIG. 11), and host (such as host 916 of FIG. 9 and/or host 1200 of FIG. 12) discussed in the preceding paragraphs will now be described with reference to FIG. 14.

Like host 1200, embodiments of host 1402 include hardware, such as a communication interface, processing circuitry, and memory. The host 1402 also includes software, which is stored in or accessible by the host 1402 and executable by the processing circuitry. The software includes a host application that may be operable to provide a service to a remote user, such as the UE 1406 connecting via an over-the-top (OTT) connection 1450 extending between the UE 1406 and host 1402. In providing the service to the remote user, a host application may provide user data which is transmitted using the OTT connection 1450.

The network node 1404 includes hardware enabling it to communicate with the host 1402 and UE 1406. The connection 1460 may be direct or pass through a core network (like core network 906 of FIG. 9) and/or one or more other intermediate networks, such as one or more public, private, or hosted networks. For example, an intermediate network may be a backbone network or the Internet.

The UE 1406 includes hardware and software, which is stored in or accessible by UE 1406 and executable by the UE's processing circuitry. The software includes a client application, such as a web browser or operator-specific "app" that may be operable to provide a service to a human or non-human user via UE 1406 with the support of the host 1402. In the host 1402, an executing host application may communicate with the executing client application via the OTT connection 1450 terminating at the UE 1406 and host 1402. In providing the service to the user, the UE's client application may receive request data from the host's host application and provide user data in response to the request data. The OTT connection 1450 may transfer both the request data and the user data. The UE's client application may interact with the user to generate the user data that it provides to the host application through the OTT connection 1450.

The OTT connection 1450 may extend via a connection 1460 between the host 1402 and the network node 1404 and via a wireless connection 1470 between the network node 1404 and the UE 1406 to provide the connection between the host 1402 and the UE 1406. The connection 1460 and wireless connection 1470, over which the OTT connection 1450 may be provided, have been drawn abstractly to illustrate the communication between the host 1402 and the UE 1406 via the network node 1404, without explicit reference to any intermediary devices and the precise routing of messages via these devices.

As an example of transmitting data via the OTT connection 1450, in step 1408, the host 1402 provides user data, which may be performed by executing a host application. In some embodiments, the user data is associated with a particular human user interacting with the UE 1406. In other embodiments, the user data is associated with a UE 1406 that shares data with the host 1402 without explicit human interaction. In step 1410, the host 1402 initiates a transmission carrying the user data towards the UE 1406. The host 1402 may initiate the transmission responsive to a request transmitted by the UE 1406. The request may be caused by human interaction with the UE 1406 or by operation of the client application executing on the UE 1406. The transmission may pass via the network node 1404, in accordance with the teachings of the embodiments described throughout this disclosure. Accordingly, in step 1412, the network node 1404 transmits to the UE 1406 the user data that was carried in the transmission that the host 1402 initiated, in accordance with the teachings of the embodiments described throughout this disclosure. In step 1414, the UE 1406 receives the user data carried in the transmission, which may be performed by a client application executed on the UE 1406 associated with the host application executed by the host 1402.

In some examples, the UE 1406 executes a client application which provides user data to the host 1402. The user data may be provided in reaction or response to the data received from the host 1402. Accordingly, in step 1416, the UE 1406 may provide user data, which may be performed by executing the client application. In providing the user data, the client application may further consider user input received from the user via an input/output interface of the UE 1406. Regardless of the specific manner in which the user data was provided, the UE 1406 initiates, in step 1418, transmission of the user data towards the host 1402 via the network node 1404. In step 1420, in accordance with the teachings of the embodiments described throughout this disclosure, the network node 1404 receives user data from the UE 1406 and initiates transmission of the received user data towards the host 1402. In step 1422, the host 1402 receives the user data carried in the transmission initiated by the UE 1406.

One or more of the various embodiments improve the performance of OTT services provided to the UE 1406 using the OTT connection 1450, in which the wireless connection 1470 forms the last segment. More precisely, the teachings of these embodiments may allow a source node to determine whether to configure or not configure the SHR to the UE, and thereby saving configuration signaling and UE memory consumption.

In an example scenario, factory status information may be collected and analyzed by the host 1402. As another example, the host 1402 may process audio and video data which may have been retrieved from a UE for use in creating maps. As another example, the host 1402 may collect and analyze real-time data to assist in controlling vehicle congestion (e.g., controlling traffic lights). As another example, the host 1402 may store surveillance video uploaded by a UE. As another example, the host 1402 may store or control access to media content such as video, audio, VR or AR which it can broadcast, multicast or unicast to UEs. As other examples, the host 1402 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1450 between the host 1402 and UE 1406, in response to variations in the measurement results. The measurement procedure and/or the network functionality for reconfiguring the OTT connection may be implemented in software and hardware of the host 1402 and/or UE 1406. In some embodiments, sensors (not shown) may be deployed in or in association with other devices through which the OTT connection 1450 passes; the sensors may participate in the measurement procedure by supplying values of the monitored quantities exemplified above, or supplying values of other physical quantities from which software may compute or estimate the monitored quantities. The reconfiguring of the OTT connection 1450 may include message format, retransmission settings, preferred routing etc.; the reconfiguring need not directly alter the operation of the network node 1404. Such procedures and functionalities may be known and practiced in the art. In certain embodiments, measurements may involve proprietary UE signaling that facilitates measurements of throughput, propagation times, latency and the like, by the host 1402. The measurements may be implemented in that software causes messages to be transmitted, in particular empty or 'dummy' messages, using the OTT connection 1450 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

What is claimed is:

1. A method performed by a communication device for configuration of a successful handover report, SHR, the method comprising:
- receiving a SHR configuration from a first network node, the SHR configuration including a triggering condition;
- applying the SHR configuration;
- responsive to the triggering condition being satisfied during a handover of the communication device from the first network node to a second network node, storing the SHR generated based on the SHR configuration; and
- retaining the SHR configuration after successful handover completion to the second network node responsive to a timer.

2. The method of claim 1, wherein applying the SHR configuration further comprises storing the SHR configuration.

3. The method of claim 1, further comprising:
- receiving a request for the SHR from a third network node; and
- transmitting the SHR to the third network node.

4. The method of claim 3, wherein the third network node is separate and distinct from the first network node and the second network node.

5. A method performed by a first network node for configuration of a successful handover report, SHR, the method comprising:
- transmitting a request for SHR configuration information to a second network node, the first network node being a source node for a handover of a communication device and the second network node being a target node for the handover of the communication device;
- receiving the SHR configuration information from the second network node, the SHR configuration information associated with the communication device; and
- transmitting a SHR configuration to the communication device;
- wherein transmitting the request for SHR configuration information comprises transmitting at least one of:
  - a request of whether SHR retrieval is supported by the second network node; and
  - a proposed SHR configuration that the first network node plans to provide to the communication device.

6. The method of claim 5, wherein the proposed SHR configuration comprises at least one of:
- an indication of a triggering condition selected by the first network node; and
- an indication of an amount of time after the handover during which the communication device is to store the SHR if the communication device is handed over to a third network node.

7. The method of claim 5, wherein receiving the SHR configuration information comprises receiving at least one of:
- an indication of whether the second network node is capable of SHR retrieval;
- an indication of a triggering condition selected by the second network node; and
- an indication of an amount of time the communication device is to maintain the SHR configuration after the handover.

8. The method of claim 5, wherein transmitting the request for SHR configuration information comprises transmitting the request for SHR configuration information via a Xn interface as part of preparation for the handover.

9. The method of claim 5, wherein receiving the SHR configuration information comprises receiving the SHR configuration information via a Xn interface as part of preparation for the handover.

10. The method of claim 5, further comprising:
- determining the SHR configuration based on the SHR configuration information to include a triggering condition selected by the first network node.

11. The method of claim 5, wherein the SHR configuration information includes an indication of a triggering condition selected by the second network node,
- the method further comprising:
  - determining the SHR configuration based on the SHR configuration information to include the triggering condition selected by the second network node.

12. The method of claim 5, further comprising:
- subsequent to transmitting the SHR configuration, receiving a SHR associated with the communication device.

13. The method of claim 12, wherein receiving the SHR comprises receiving the SHR from a third network node,
- the method further comprising:
  - responsive to receiving the SHR, transmitting the SHR to the second network node.

14. The method of claim 13, wherein transmitting the SHR to the second network node comprises:

determining that the SHR comprises an indication that the SHR was generated in response to a triggering condition included in the SHR configuration information; and transmitting the SHR to the second network node in response to determining that the SHR comprises the indication that the SHR was generated in response to the triggering condition included in the SHR configuration information.

15. A method performed by a second network node for configuration of a successful handover report, SHR, the method comprising:

receiving a request for SHR configuration information from a first network node, the first network node being a source node for a handover of a communication device and the second network node being a target node for the handover of the communication device;

determining the SHR configuration information, the SHR configuration information associated with the communication device; and transmitting the SHR configuration information to the first network node, wherein receiving the request for SHR configuration information comprises receiving at least one of:

a request of whether SHR retrieval is supported by the second network node; and a proposed SHR configuration that the first network node plans to provide to the communication device.

16. The method of claim 15, wherein the proposed SHR configuration comprises at least one of:

an indication of a triggering condition selected by the first network node; and an indication of an amount of time after the handover during which the communication device is to store the SHR if the communication device is handed over to a third network node.

17. A method performed by a third network node for handling a successful handover report, SHR, the method comprising:

receiving the SHR from a communication device, the SHR associated with a handover of the communication device between a first network node and a second network node; and transmitting the SHR to at least one of the first network node and the second network node based on a determination of which of the first network node and the second network node selected the triggering condition that caused generation of the SHR.

18. A non-transitory computer-readable medium having instructions stored therein that are executable by processing circuitry of a communication device to cause a network node to perform operations comprising:

receiving a SHR configuration from a first network node, the SHR configuration including a triggering condition;

applying the SHR configuration; and responsive to the triggering condition being satisfied during a handover of the communication device from the first network node to a second network node, storing the SHR generated based on the SHR configuration; and retaining the SHR configuration after successful handover completion to the second network node responsive to a timer.

* * * * *